United States Patent [19]

Woods

[11] 3,743,858

[45] July 3, 1973

[54] SHIFT REGISTER

[75] Inventor: David H. Woods, Monroeville, Pa.

[73] Assignee: Westinghouse Electric Corporation, Pittsburgh, Pa.

[22] Filed: Oct. 4, 1971

[21] Appl. No.: 186,107

[52] U.S. Cl. .............. 321/221 R, 307/218, 307/282

[51] Int. Cl. .............................................. G11c 11/40

[58] Field of Search .................... 307/221 R, 223 R, 307/221 B, 218, 282; 328/219, 37

[56] References Cited

UNITED STATES PATENTS

| | | | |
|---|---|---|---|
| 3,173,094 | 3/1965 | Hoegeman | 307/223 R |
| 3,185,864 | 5/1965 | Amodei et al. | 307/221 B |
| 3,210,559 | 10/1965 | Gabriel | 307/221 R |
| 3,297,950 | 1/1965 | Lee | 307/221 R |

*Primary Examiner*—John S. Heyman
*Attorney*—F. H. Henson, Jack M. Arnold et al.

[57] ABSTRACT

A shift register is comprised of a plurality of bistable devices with the output of a given bistable device being coupled to the input of the following bistable device by way of a memory circuit which stores a signal indicative of the binary state of the given bistable device in response to the concurrent provision of a shift signal. A reset pulse for each stage of the shift register is also provided in response to the provision of the shift signal. The memory device stores the binary signal for a predetermined interval of time after the cessation of the reset signal, so that the following bistable device may be set to the same binary state that the given bistable device was in prior to the provision of the reset signal.

3 Claims, 5 Drawing Figures

SHIFT REGISTER

CROSS REFERENCE TO RELATED APPLICATION

Reference is made to U.S. Pat. No. 3,600,604 entitled "Failsafe Logic Gates" filed Dec. 3, 1968, Ser. No. 780,662 on behalf of George M. Thorne-Booth. The above named patent is assigned to the assignee of the present invention.

BACKGROUND OF THE INVENTION

In any shift register which is comprised of a plurality of bistable devices, such as flip-flops, and which is used to generate a binary code which may be used, for example, to control the movement of vehicles, it is desirable that the shift register function in a manner such that there is no failure of components. If, however, there is a component failure, the component must be designed to fail in a predetermined direction. This feature is particularly important in a vehicle control system wherein a binary code which is generated may be used to control the speed of vehicles operational in the system. It is clear that if an erroneous code is generated, there may result a vehicle collision which in turn may cause loss of life and property.

There are three normal types of failure of bistable devices such as flip-flops which may cause improper operation of a shift register. The first of these failures is that a flip-flop may hang up in the binary 1 state or the binary 0 state. The second type of failure is a short between stages of the shift register or from the input of the shift register to the output of the shift register. In effect, the shift register may function in a manner such that one or more stages of the shift register may be shorted out. This results in the shift register operating at a repetition rate which is higher than the normal repetition rate for which the shift register is designed. The third type of failure which may occur is when a shift register is clocked synchronously and one or more of the flip-flops in the shift register begins to toggle backwards and forwards as if it were dividing by two. It is clear that one or more of the above-mentioned failures results in improper operation of the shift register and accordingly, an improper binary code will be derived from the shift register.

According to the teachings of the present invention, a shift register is provided which is substantially failsafe, and in which the above-named failure modes are eliminated or at least substantially reduced, such that an undesired binary code may not be derived from the shift register.

SUMMARY OF THE INVENTION

According to the teachings of the present invention, a shift register having a plurality of stages is provided. Included are means responsive to a given stage of the shift register being in a predetermined binary state concurrent with the provision of a shift signal for changing the binary state of the shift register stage following the given shift register stage to the same predetermined binary state. Also, included are means responsive to the provision of the shift signal for applying a reset signal to each stage of the shift register.

DESCRIPTION OF THE PREFERRED EMBODIMENT

Figure 1:
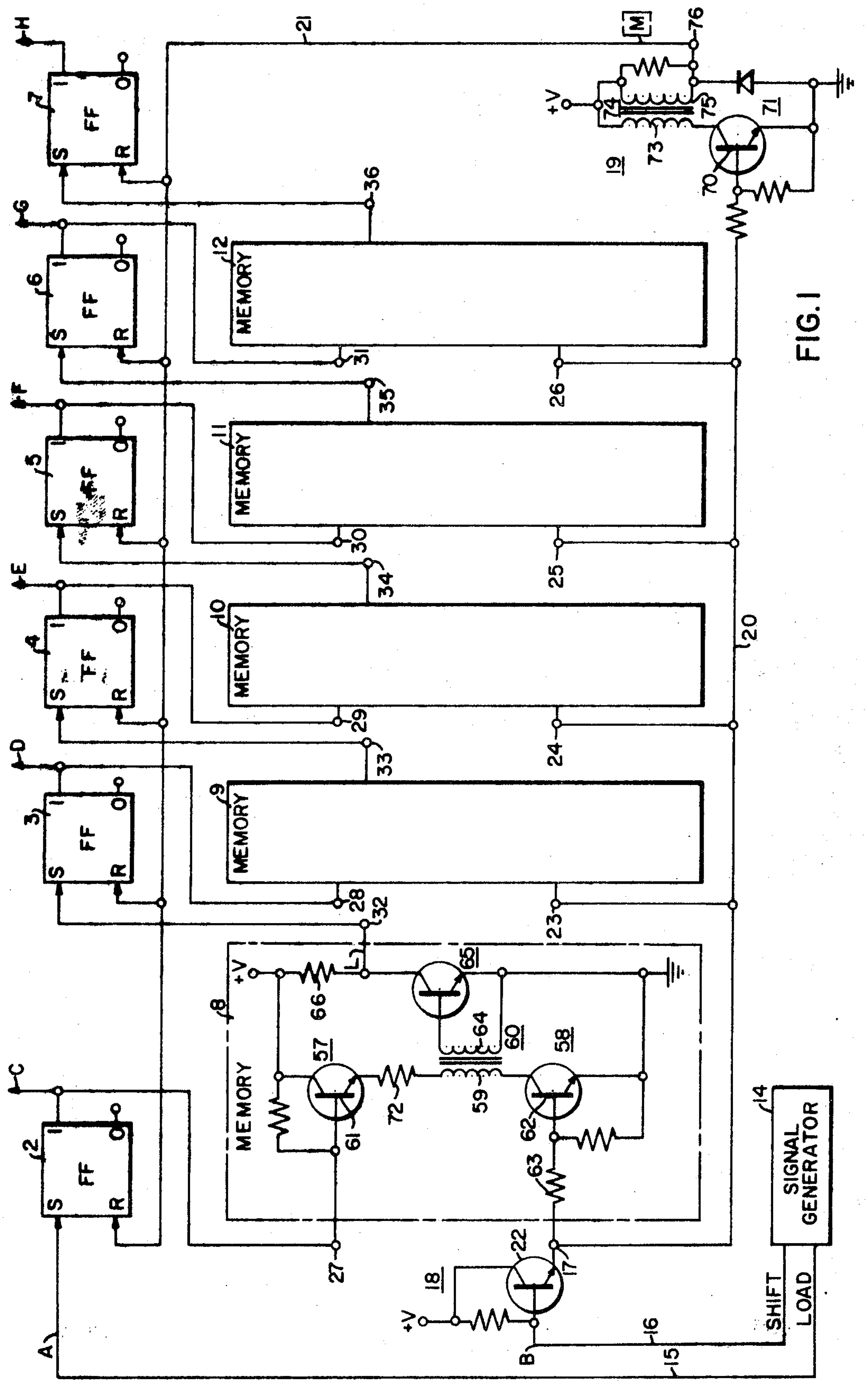
FIG. 1 is a schematic and block diagram representation of a shift register embodying the teaching of the present invention.

In FIG. 1 there is illustrated a shift register having n stages, where n is an integer, and which is comprised of a plurality of bistable elements such as the set-reset, flip-flops 2 through 7. Intermediate each flip-flop stage of the shift register are $n-1$ memory devices, such as the memory devices 8 through 12, respectively. A signal generator 14 provides an information or load pulse at a frequency $f2$ to the set input of the first flip-flop 2 by way of a line 15. The signal generator 14 also provides a shift pulse at a frequency $f1$, via line 16 to the first input terminals 17 through 26 of the memory devices 8 through 12, respectively, by way of a buffer amplifier 18. The load pulse frequency is $f2$, where $f2=f1/n$, therefore the load pulse signal indication may be shifted through each of the shift register stages during the time interval between load pulses. The output signal provided by the buffer amplifier 18 is also coupled to the input of a pulse shaping network 19 by way of a line 20. In response to the provided shift pulse, the pulse shaping network 19 provides a reset pulse to each of the flip-flop stages of the shift register by way of a line 21.

Figure 2:
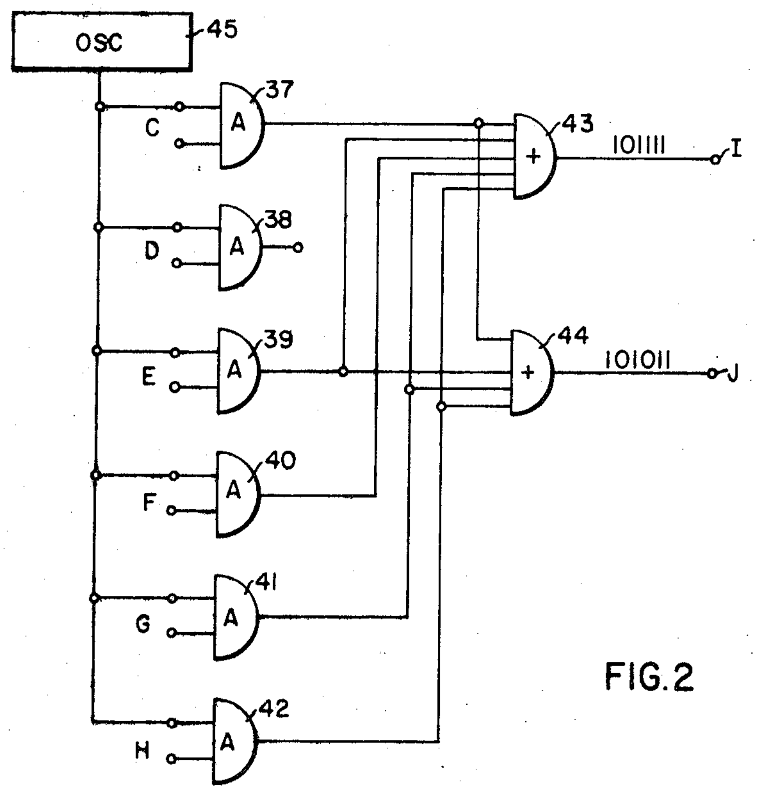
FIG. 2 is a decoder which may be used with the shift register of FIG. 1.
Figure 4:
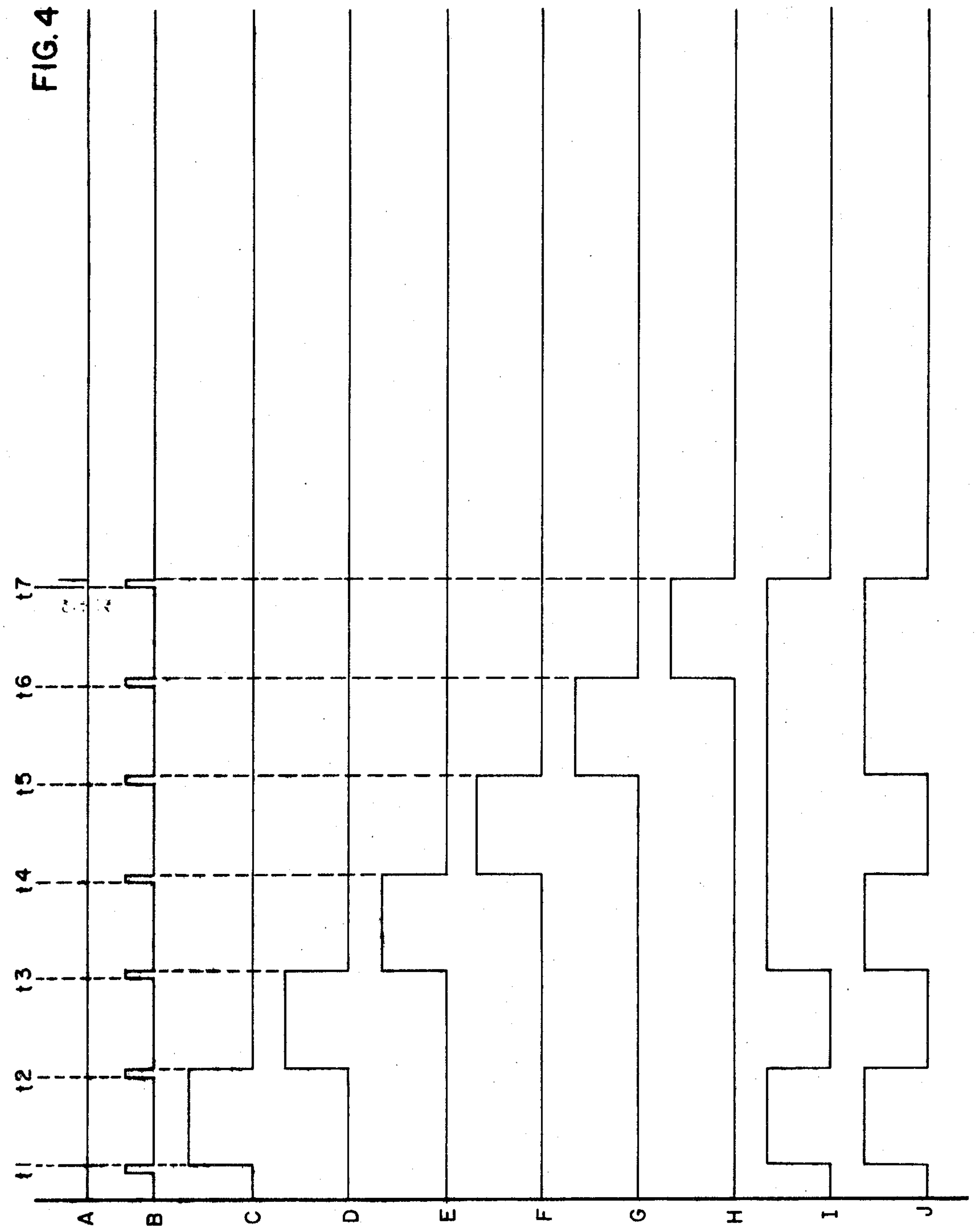
FIG. 4 is a wave-shape relationship diagram of certain waveforms present in the circuits of FIGS. 1 and 2.

The letters A through J found on FIGS. 1 and 2 are the circuit points at which the wave-shapes A through J, respectively, as shown in FIG. 4, are present in the circuits of FIGS. 1 and 2. It is to be appreciated that the wave-shapes illustrated in FIG. 4 are idealized and represent a logical condition of the respective elements at a given time rather than the actual wave-shapes being generated in the circuit. With reference to FIGS. 1 and 4, consider now the general operation of the shift register which embodies the teachings of the present invention. The signal generator 14 provides the load pulse to the set terminal of the flip-flop 2 at a time $t1$ (see wave-shape A of FIG. 4). The latter load pulse sets the flip-flop 2 to the binary 1 state (see wave-shape C of FIG. 4). At a time $t2$ the signal generator 14 provides a shift pulse to the input terminal of the buffer amplifier 18 making the transistor 22 conductive, and in response thereto a positive shift pulse is applied to the input terminals 17 through 26 of the memory devices 8 through 12, respectively, and also to the input of the pulse shaping network 19. Since at the time $t2$ the flip-flop 2 is in the binary 1 state, the memory device 8 now has both input terminals at a binary 1 level, and in response thereto provides a binary 1 set pulse at the output terminal 32 and in turn to the set terminal of flip-flop 3, setting the latter flip-flop stage to the binary 1 state. Shortly thereafter, the pulse shaping network 19, in response to the shift pulse at time $t2$, provides a reset signal to each of the flip-flop stages setting them to the binary 0 state. The flip-flop 3 remains in the set condition, however, as the pulse width or time duration of the set pulse is longer in duration than the pulse width or time duration of the reset signal. This features is to be explained in detail shortly. The memory device 9 now has applied to its second input terminal 28 the binary 1 signal from the 1 terminal of the flip-flop 3, and in response to the next shift pulse, at a time *t*3, the memory device 9 provides an output binary 1 pulse setting the flip-flop 4 to the binary 1 state. In response to each of the succeeding shift pulses at times *t*4 through *t*7 the original load pulse indication is shifted, as may be seen by referring to wave-shapes F through H, respectively, of FIG. 4. A binary coded message may now be derived from the outputs of the flip-flop stages of the shift register by selectively gating the output signals. Since set-reset flip-flops are used in the practice of the invention, the failure problem of the flip-flops toggling back and forth from one binary state to the other is eliminated since the flip-flops are not synchronously clocked.

Refer briefly to FIG. 2 which illustrates a decoder which may be connected to selected outputs of certain ones of the flip-flop stages of the shift register, whereby a predetermined binary code may be generated. The decoder is comprised of a plurality of AND gates such as the AND gates 37 through 42 and a number of OR gates such as the gates 43 and 44. A first input terminal of each of the AND gates is connected to the output of an oscillator 45 which provides a periodic output signal, for example at a 155 KHZ rate. In response to a binary 1 signal being applied to the second or remaining input terminal of a particular AND gate, an output signal is provided at the output of the AND gate. As long as there is an input periodic signal provided by the oscillator concurrent with the provision of a binary 1 pulse from the associated flip-flop, the particular AND gate then provides an output signal. The AND gates in turn may have their output terminals connected in a predetermined manner to the inputs of the OR gates such that a binary code is generated. It may be seen that at the output of the gate 43 the binary code 101111 is generated (see wave-shape I of FIG. 4) and at the output of gate 44 the binary code 101011 is generated (see wave-shape J of FIG. 4), as the successive shift pulses are applied to the intermediate memory stages of the shift register. It is seen that the AND gate 38 is not used in generating the latter codes, but may be used for generating codes not illustrated. If the AND gates 37 to 42 are of the type that respond only to a periodic signal being provided to the second input terminal, that being the input terminal which is connected to a flip-flop output, then the failure problem of a shift register hanging up in either the 1 or 0 state is eliminated as the AND gate provides a zero output signal under this condition. This feature is to be explained shortly.

Figure 3:
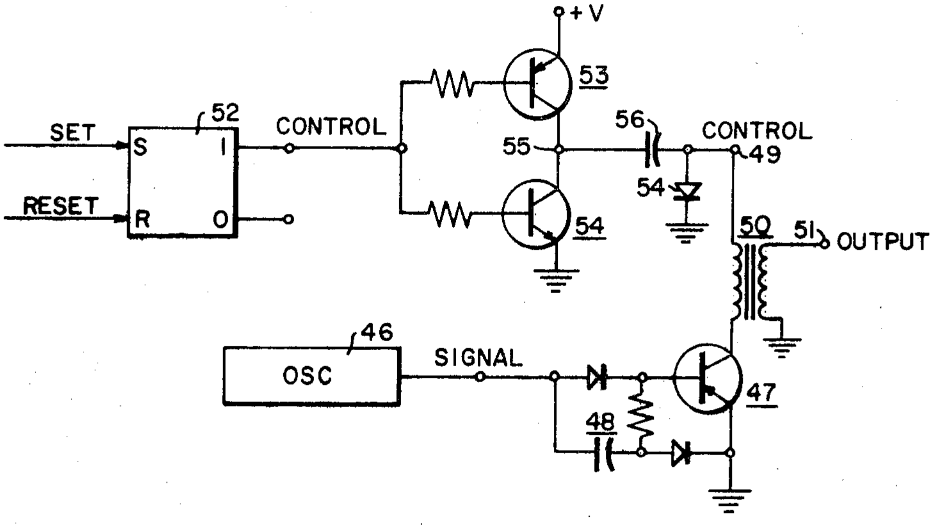
FIG. 3 is a schematic diagram of an AND gate which may be used in the decoder of FIG. 2.

Refer briefly to FIG. 3 which illustrates an AND gate suitable for use in the practice of the present invention. The AND gate illustrated is the subject matter of the previously referenced U.S. Pat. No. 3,600,604, Ser. No. 780,662, entitled "Fail Safe Logic Gates", and the operation of the AND gate is described in detail therein. An oscillator 46 provides a periodic input signal, for example at 155 KHZ, to the base electrode of a transistor 47 by way of the level shifting network 48. The second input to the AND gate is at the control input terminal 49, which requires a negative voltage level sufficient to provide operating potential for the transistor 47 by way of the primary winding of a transformer 50. Whenever this latter negative operating potential is provided to the collector electrode of the transistor 47, the transistor 47 then becomes periodically conductive and then nonconductive in response to the periodic signal provided to its base electrode. In response to the latter input signals the AND gate then provides a periodic signal at the output terminal 51.

A set-reset flip-flop 52 is illustrative of one of many control devices which may be used to control the application of the control signal to the second input terminal 49 of the AND gate. Assume the flip-flop 52 initially is in a reset or binary 0 state. At this time the 1 output terminal is at a 0 volt level, and this 0 volts is applied to the base electrodes of the transistors 53 and 54. The transistor 54 is nonconductive since its base and emitter electrodes are at the same potential, and the transistor 53 is conductive since its emitter electrode is more positive than its base electrode. Since transistor 53 is conducting, circuit point 55 is essentially at a level of +V and the diode 54 becomes conductive due to the positive charge on the capacitor 56, whereby the control input terminal 49 is pulled to ground or zero potential. This zero potential maintains the transistor 47 nonconductive, and accordingly no output signal is provided at the output terminal 51. It is clear that it is a safe condition if the flip-flop 52 hangs up in the zero state, since no output signal is provided by the AND gate. Assume now that a set signal is applied to the set terminal of the flip-flop 52. In response to the latter set signal, the flip-flop 52 switches to the binary 1 state, and a positive (+V) or binary 1 signal is provided at the 1 output terminal, and in turn to the base electrodes of the transistors 53 and 54. The transistor 53 now becomes nonconductive since its base and emitter electrodes are essentially at the same potential. The transistor 54 now becomes conductive since its base electrode is more positive than its emitter electrode. Since transistor 54 is now conducting, circuit point 55 switches from a +V level to a 0 volt level, and the diode 54 becomes nonconductive and the voltage level at control input terminal 49 switches from 0 volts to −V volts as the result of the capacitor 56 maintaining a finite charge differential between circuit point 55 and control input terminal 49. This latter negative voltage level (−V) at control input terminal 49 is applied to the collector electrode of the transistor 47 by way of the primary winding of the transformer 50, making the transistor 47 conductive whereby the periodic signal applied to its base electrode is essentially reproduced at the output terminal 51. Assume that the flip-flop 52 hangs up in the binary 1 state. The capacitor 56 then discharges through the conducting transistor 47 in an interval of time determined by the capacitance of the capacitor 56. Once the capacitor 56 discharges, the control input terminal 49 essentially reaches 0 volts, and transistor 47 becomes nonconductive whereby no output signal is provided at the output terminal 51. It is seen that this is a safe failure as no output signal is provided. Therefore, it is seen that if the set-reset signals are not applied to the flip-flop 52 at a repetition rate which is faster than the discharge time constant of the capacitor 56, no output signal is provided at the output terminal 51. It is seen therefore that a fail-safe AND gate as illustrated in FIG. 3 and used in conjunction with the set-reset flip-flop of the shift register illustrated in FIG. 1 eliminates the failure condition of an undesired binary code being generated in the event that a flip-flop hangs up in either the binary 1 or the binary 0 state.

Return now to FIG. 1 for a detailed description of the operation of the memory devices 8 through 12 and the pulse shaping network 19, whereby it may be seen that the failure condition of a short between the input and output of flip-flop stages is eliminated since the memory devices provide AC coupling between the shift register stages and therefore eliminate the possibility of any direct current (DC) path between the stages. The memory devices also function to store a signal indicative of the binary state of the flip-flop stage connected to its second input for a time interval which is of a duration greater than the time interval or duration of the reset pulse which is coupled to the reset terminal of each of the flip-flop stages. This function will be explained in detail shortly. The operation of the memory device 8 is to be explained in detail. It is to be appreciated that the memory devices 9 through 12 operate in a like manner. The memory device 8 is comprised of transistors 57 and 58 having their conduction paths coupled together by way of the primary winding 59 of a transformer 60. The control or base electrode 61 of the transistor 57 is coupled to the input terminal 27 of the memory device 8, and the control or base electrode 62 of the transistor 58 is coupled to the input terminal 17 of the memory device 8 by way of a resistor 63. The transistors 57 and 58 having their conduction paths connected in series operate as an AND gate since for current to flow through the primary winding 59 of transformer 60, respective input signals must be concurrently applied to the input terminals 17 and 27 of the memory device. The secondary winding 64 of the transformer 60 acts as an energy storage device to remember when input signals have been concurrently applied to the input terminals 17 and 27 which is manifested by the flow of current through the primary winding 59 and the subsequent cessation of current flow due to one of the input signals being terminated. The secondary winding 64 of the transformer 60 has one terminal thereof connected to circuit ground and the other terminal thereof connected to the control or base electrode of a transistor 65, which has its emitter electrode connected to circuit ground and its output or collector electrode connected to a source of operating potential +V by way of a resistor 66. The collector electrode of the transistor 65 is also connected to the output terminal 32 of the memory device 8. The transistor 65 functions as a switch to provide an output signal indicative of the binary signal state that the memory device 8 is storing at a given instance of time.

Figure 5:
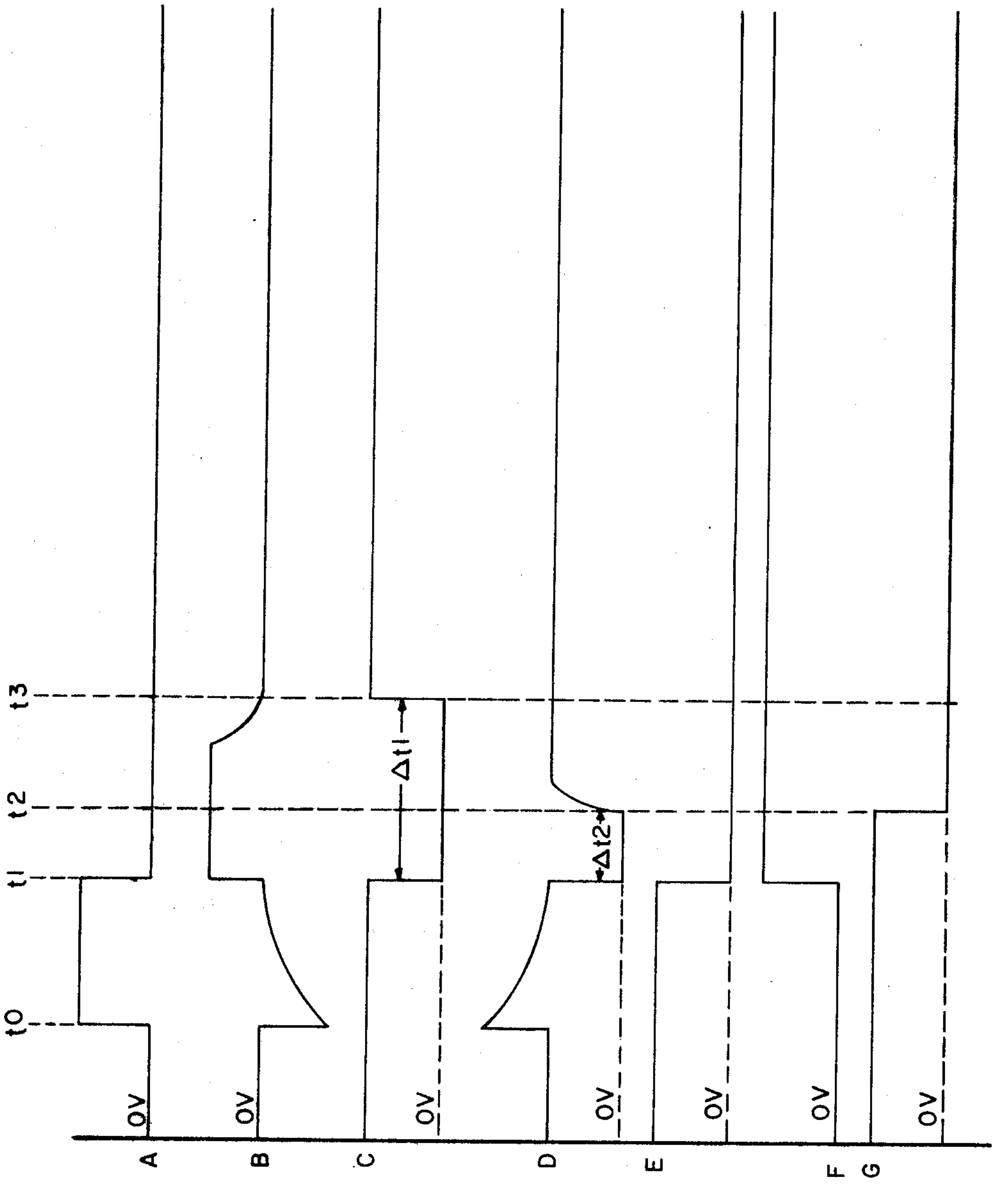
FIG. 5 is a wave-shape relationship diagram which is helpful in the understanding of the operation of the shift register of FIG. 1.

Consider now the detailed operation of a memory device such as the memory device 8 and the pulse shaping network 19 as used to set and reset, respectively, the flip-flop stages of the shift register. Referring now to FIG. 1, in conjunction with FIG. 5, the detailed operation of the aforementioned devices will now be described. Consider that the flip-flop 2 is in a binary 1 state at this time, that is it has been previously set to the 1 state by a load pulse being applied to its set terminal by way of the signal generator 14. Accordingly, a binary 1 signal is now applied to the second input terminal 27 of the memory device 8 (see wave-shape E of FIG. 5). The transistors 57 and 58 are nonconductive at this time, however, since the base electrode 62 of the transistor 58 is not receiving an input pulse at this time. At a time *to* a shift pulse (see wave-shape A of FIG. 5) is applied from the signal generator 14 to the base electrode of the transistor 22 and in response thereto a positive pulse is produced at its emitter electrode and in turn applied to the first input terminal 17 of the memory device 8 and to the base electrode 70 of the transistor 71 which forms part of the pulse shaping network 19. In response to the shift pulse being applied to the base electrode 62 of the transistor 58, the transistors 57 and 58 concurrently become conductive since their base electrodes are both at a positive potential and current begins to flow through the aforementioned transistors and through the resistor 72 and the primary winding 59 of the transformer 60. In response to the induced negative voltage potential across the secondary winding 64 of the transformer 60 and the base electrode of the transistor 65, the transistor 65 is held nonconductive. See waveshape B of FIG. 5 which is the voltage waveform present at the base electrode of transistor 65. At a time *t1* the shift pulse (see wave-shape A of FIG. 5) applied to the input terminal 17 ceases and in response thereto the transistor 58 is now held nonconductive. Accordingly, current no longer flows through the primary winding 59 of the transformer 60. The transformer 60, however, attempts to keep current flowing and the back electromotive force (EMF) of the transformer causes the current to flow from circuit ground through the secondary winding 64 into the base electrode of the transistor 65 causing the transistor 65 to become conductive whereupon a negative voltage pulse, due to the decrease in collector voltage, is provided at the output terminal 32 (see waveshape C of FIG. 5). The duration or pulse width of the output pulse at the terminal 32 is determined by the LR time constant of the transformer 60. The duration of the set pulse at the terminal 32 is of a time duration $\Delta t1$ (see wave-shape C of FIG. 5).

During the time interval $\Delta t1$ the secondary winding 64 of transformer 60 is essentially releasing stored energy which is indicative of the flip-flop 2 having previously been in the binary 1 state.

Consider now the method of generating the reset pulse. At the time *to* the shift pulse, as was explained previously, is applied to the control or base electrode 70 of the transistor 71 and in response thereto the transistor 71 becomes conductive and current is drawn through the primary winding 73 of a transformer 74. A positive voltage pulse is produced at the output terminal 76 of the pulse shaping network 19 in response to the initial current flow through the secondary winding 75 of the transformer (see waveshape D of FIG. 5). At a time *t1* the shift pulse terminates and the transistor 71 becomes nonconductive. The transformer 54 attempts to maintain current flow due to its back EMF, and a negative voltage pulse is generated at this time having a time duration of $\Delta t2$, which is determined by the LR time constant of the transformer 74 (see wave-shape D of FIG. 5). This latter negative voltage pulse is concurrently applied to the reset terminal of each of the flip-flops 2 through 7 of the shift register. It may be seen that the time duration or pulse width ( $\Delta t2$) of the reset pulse is substantially shorter in duration than the time duration of the set pulse ( $\Delta t1$). This is to insure that while all of the flip-flops are reset, the particular flip-flop that has a binary 1 signal or a set signal applied to its set terminal will remain in a set condition following the cessation of the reset pulse. This is necessary so that the binary 1 signal may be shifted to the following flip-flop at the next shift pulse time following the reset signal. It may be seen that at the time $t1$ the flip-flop 3 is set to the binary 1 state (see wave-shape F of FIG. 5) in response to the set pulse, and concurrently a reset pulse is applied to its reset terminal attempting to set the flip-flop 3 to the binary zero state. The other flip-flops, for example flip-flop 2, are set to the zero state (see wave-shape E of FIG. 5). The flip-flop 3, however, is concurrently in the binary 1 and zero state at this time. The 1 terminal of the flip-flop 3 is at a 1 level (see wave-shape F of FIG. 5) and the 0 terminal of flip-flop 3 is at a 1 level (see wave-shape G of FIG. 5). However, at the time $t2$ when the reset pulse terminates (see waveshape D of FIG. 5), the flip-flop 3 remains in the binary 1 state since the set pulse is still at a negative level until the time $t3$ (see waveshape E of FIG. 5). The binary 1 signal may then be shifted to the flip-flop 4 at the next shift pulse time.

Since it is known the rate of change of current that is the $di/dt$ equals the voltage over the inductance, the pulse widths of the set and reset pulses may readily be determined by the appropriate choice of the voltage applied to, and the inductance of the particular transformer, since the pulse width is proportional to the $di/dt$. For example, if it is desired that the pulse width $\Delta t1$ of the set pulse provided by the memory device be of a duration 3 times as great as the pulse width $\Delta t2$ of the reset pulse, the following general formula may be used to calculate the inductance of the transformers 60 and 74.

Let L1 equal the inductance of transformer 60 and L2 equal the inductance of transformer 74. Also assume that the voltage across, and the rate of change of current through ($di$) the transformers 60 and 74 are the same. This is a simplification for purposes of explanation, and it is to be appreciated that the secondary voltages across the respective transformers are different in the disclosed embodiment, and in practice must be scaled into the equations.

1. $\Delta t1 = 3\Delta t3$
2. $\Delta t1 = dt = di\ (L1/V)$
3. $\Delta t3 = dt = di\ (L2/V)$
   substitute (2) and (3) in (1)
4. $di\ (L1/V) = 3\ di\ (L2/V)$
   therefore
5. $L1 = 3L2$ It is seen therefore that by choosing the inductance of the transformer 60 to be 3 times the value of the inductance of the transformer 74, the set pulse width $\Delta t1$ is on the order of three times longer in duration than the reset pulse width $\Delta t2$.

In summary, a shift register of n stages has been provided with $n-1$ memory means, one of which is connected between each shift register stage. In response to a load pulse of frequency $f2$, a binary 1 signal is stored in the first flip-flop stage and is successively shifted to the succeeding flip-flop stages in response to shift pulses at a frequency $f1$, where $f2 = f1/n$.

I claim:

1. In a shift register having n stages, where n is an integer, the combination comprising:

signal generating means for providing a shift pulse at a frequency f1 and a load pulse at a frequency $f2=f1/n$, said load pulse being applied to the first stage of said shift register;

$n-1$ memory means having first and second inputs and an output, the output of the first stage of said shift register being connected to the first input of the first memory means, and the output of the first memory means being connected to the input of the second stage of said shift register and so on, with the output of the $n$th$-1$ stage of said shift register being connected to the first input of the $n$th memory means, and the output of the $n$th$-1$ memory means being connected to the input of the nth stage of said shift register, the second input of each memory means being responsive to said shift pulse for providing a set pulse at the output of a given memory means whenever the first input of the given memory means is concurrently at a predetermined binary level;

wherein each of said $n-1$ memory means comprises first and second transistors having their conduction paths connected in series by way of the primary winding of a transformer, the control electrode of the first transistor comprising the first input of said memory means and the control electrode of the second transistor comprising the second input of said memory means, the secondary winding of said transformer being connected to the control electrode of a third transistor, the output electrode of said third transistor comprising the output of said memory means;

a pulse shaping network responsive to said shift pulse for providing a reset pulse to each stage of said shift register, said reset pulse having a leading edge substantially in time coincidence with the leading edge of said set pulse with said set pulse having a width greather than the width of said reset pulse; and a plurality of AND gates coupled to the outputs of the respective stages of said shift register, said AND gates each having a signal input, a control input and an output at which a periodic signal is provided only so long as a periodic signal is provided at the signal input concurrent with a selected binary level at a predetermined frequency being applied to the control input from the output of a selected shift register stage.

2. The combination claimed in claim 1, wherein said pulse shaping network comprises a transistor having its control electrode connected to said signal generating means for receiving said shift pulse, and having the primary winding of a transformer connected in series with the conduction path of said transistor, the secondary winding of said transformer being connected to the reset connection of each stage of said shift register.

3. In a shift register having n stages, where n is an integer, the combination comprising:

signal generating means for providing a shift pulse at a frequency f1 and a load pulse at a frequency $f2=f1/n$, said load pulse being applied to the first stage of said shift register;

$n-1$ memory means each having first and second inputs and an output, the output of the first stage of said shift register being connected to the first input of the first memory means, and the output of the first memory means being connected to the input of the second stage of said shift register and so on, with the output of the $n$th'1 stage of said shift register being connected to the first input of the nth memory means, and the output of the $n$th$-1$ memory means being connected to the input of the $n$th stage of said shift register, the second input of each memory means being responsive to said shift pulse for providing a set pulse at the output of a given memory means wherever the first input of the given memory is concurrently at a predetermined binary level;

wherein each of said $n-1$ memory means comprises first and second transistors having their conduction paths connected in series by way of the primary winding of a transformer, the control electrode of the first transistor comprising the first input of said memory means and the control electrode of the second transistor comprising the second input of said memory means, the secondary winding of said transformer being connected to the control electrode of a third transistor, the output electrode of said third transistor comprising the output of said memory means; and a pulse shaping network responsive to said shift pulse for providing a reset pulse to each stage of said shift register, said reset pulse having a leading edge substantially in time coincidence with the leading edge of said set pulse with said set pulse having a width greater than the width of said reset pulse.

* * * * *

UNITED STATES PATENT OFFICE
CERTIFICATE OF CORRECTION

Patent No. 3,743,858 Dated July 3, 1973

Inventor(s) David H. Woods

It is certified that error appears in the above-identified patent and that said Letters Patent are hereby corrected as shown below:

In the drawings, sheet 1, Fig. 1, the reference letter [M] adjacent line 21 should be deleted.

In the specification, col. 6 line 52, cancel "54" and insert -- 74 --.

In the claims, claim 1 column 8 line 6 change "nth" to -- nth-1 --; claim 3 column 8 line 62 change "nth'1" to -- nth-1 --; and column 8 line 63 change "nth" to -- nth-1 --.

Signed and sealed this 10th day of September 1974.

(SEAL)
Attest:

McCOY M. GIBSON, JR.
Attesting Officer

C. MARSHALL DANN
Commissioner of Patents